US012711017B2

(12) United States Patent
Wilcock

(10) Patent No.: US 12,711,017 B2
(45) Date of Patent: Aug. 18, 2026

(54) MINIMIZATION OF INDIVIDUAL FILE-LEVEL BACKUP FOR POLICY-BASED ARCHIVAL AND EXPIRATION

(71) Applicant: INTERNATIONAL BUSINESS MACHINES CORPORATION, Armonk, NY (US)

(72) Inventor: Glenn Randle Wilcock, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/188,274

(22) Filed: Mar. 22, 2023

(65) Prior Publication Data

US 2024/0320102 A1 Sep. 26, 2024

(51) Int. Cl.
*G06F 11/14* (2026.01)
*G06F 11/1446* (2026.01)

(52) U.S. Cl.
CPC ...... *G06F 11/1461* (2013.01); *G06F 11/1451* (2013.01)

(58) Field of Classification Search
CPC ......................... G06F 11/1461; G06F 11/1451
See application file for complete search history.

(56) References Cited

U.S. PATENT DOCUMENTS 7,406,488 B2 7/2008 Stager et al.
7,650,533 B1 * 1/2010 Saxena .............. G06F 11/1464 714/13
7,979,649 B1 * 7/2011 Thiam ................. G06F 11/1448 711/161
8,788,769 B2 7/2014 Abercrombie et al.
11,366,682 B1 * 6/2022 Krasilnikov ........ G06F 9/45558
2005/0171979 A1 * 8/2005 Stager ................. G06F 11/2074
2005/0182910 A1 * 8/2005 Stager ................. G06F 11/1456 711/159
2005/0182953 A1 * 8/2005 Stager ................. G06F 11/1435 713/189
2005/0188256 A1 * 8/2005 Stager ................. G06F 11/1469 714/13
2005/0193244 A1 * 9/2005 Stager ................. G06F 11/2082 714/12
2005/0193272 A1 * 9/2005 Stager ................. G06F 11/1471 714/42

OTHER PUBLICATIONS

Anonymous, "Enhanced Data Security within Backup Systems," IP.com No. IPCOM000250429D, Jul. 13, 2017, 7 pages.
Han, Si et al., "A Novel File-level Continuous Data Protection System," Advanced Materials Research, vol. 566, pp. 406-413, Trans Tech Publications Ltd, 2012. 9 pages.

* cited by examiner

*Primary Examiner* — Kevin Verbrugge
(74) *Attorney, Agent, or Firm* — Stephen R. Yoder

(57) ABSTRACT

Embodiments for minimizing creations of individual file backups in a safeguarded copy environment include determining, by one or more processors, a policy-based requirement exists that a backup copy of a file must be maintained in storage for a predefined time period. The one or more processors search and determine that one or more immutable point-in-time copies currently residing in storage include a current backup copy of the file. Responsive to determining that the one or more immutable point-in-time copies will expire at a time prior to an end of the predefined time period, the one or more processors create an individual backup of the file.

20 Claims, 7 Drawing Sheets

MINIMIZATION OF INDIVIDUAL FILE-LEVEL BACKUP FOR POLICY-BASED ARCHIVAL AND EXPIRATION

BACKGROUND OF THE INVENTION

Field of the Invention

Embodiments of the invention relate to minimizing creations of individual file backups in a Safeguarded Copy environment storing immutable point-in-time copies.

Description of the Related Art

Data storage systems, particularly at the enterprise level, are usually designed to provide a high level of redundancy to reduce the risk of data loss in the event of failure of a component of the data storage system. To effect this redundancy, multiple copies of data are frequently stored on multiple systems, which may be geographically dispersed. Data from a host to be stored in the data storage system is typically directed to a primary system at a local site and then replicated to a secondary system, which may be geographically remote from the primary system. Some of these copies of data may be point-in-time copies generated as a near instantaneous "snapshot" of a volume at a particular point in time. Additionally, some of these copies of data may comprise more frequently taken "safeguarded copies", which are immutable point-in-time copies designed to be stored in a secure manner to prevent the data from being compromised, whether accidentally or deliberately.

SUMMARY OF THE INVENTION

According to an embodiment of the present invention, a computer-implemented method for minimizing creations of individual file backups in a safeguarded copy environment is disclosed. The computer-implemented method includes determining, by one or more processors, a requirement exists that a backup copy of a file is to be maintained for a predefined time period. Responsive to the determining the requirement exists, the one or more processors determine that one or more immutable point-in-time copies currently stored on a storage device includes a current backup copy of the file. Responsive to determining that the one or more immutable point-in-time copies will expire at a time prior to an end of the predefined time period, the one or more processors create an individual backup of the file.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
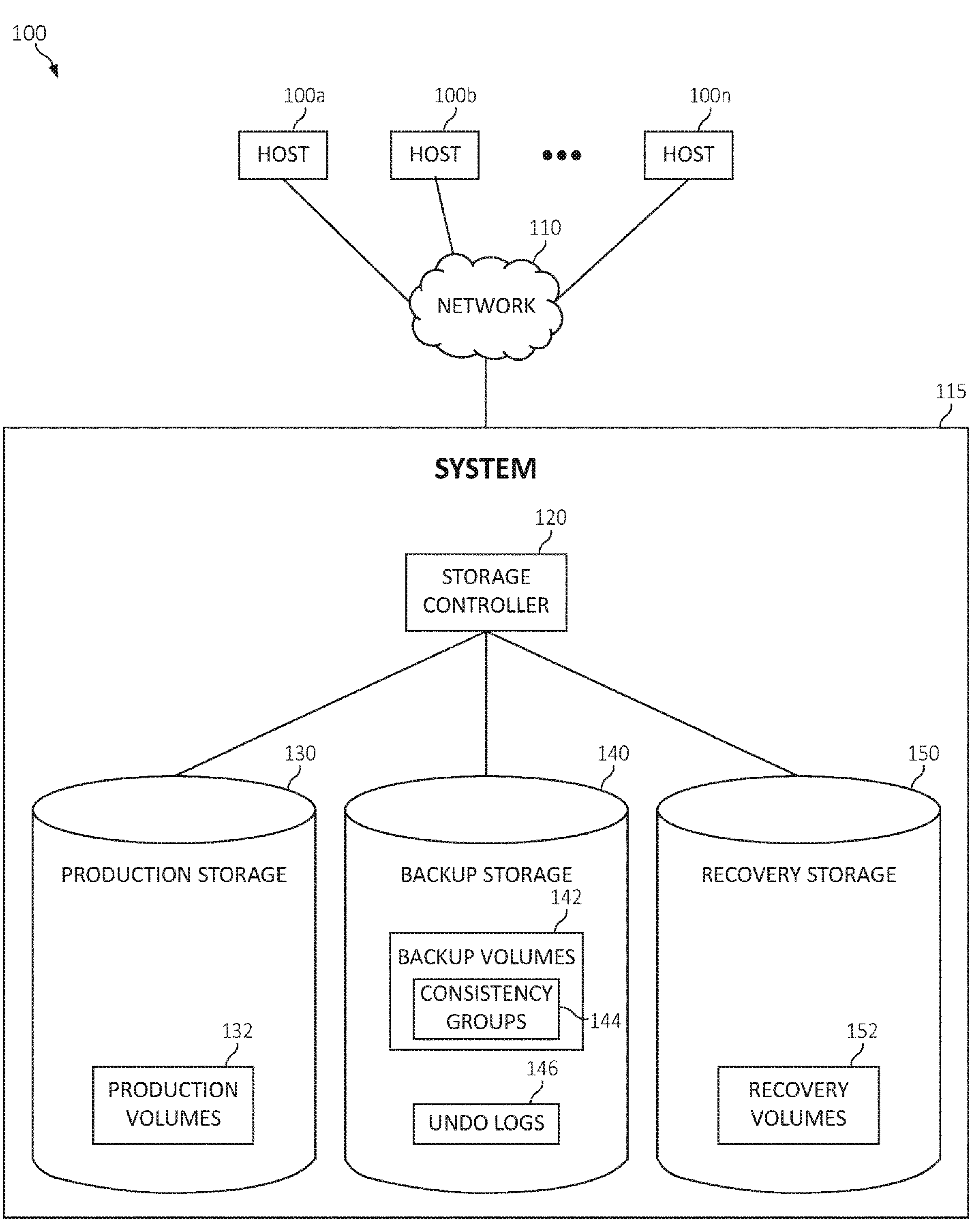
FIG. 1 illustrates, in a block diagram, a computing environment with a primary storage controller coupled to a production storage, a backup storage, and a recovery storage in accordance with certain embodiments.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

A near instantaneous copy of a volume may be generated using a point-in-time copy function such as the IBM® FlashCopy® function, for example. (IBM and FlashCopy are registered trademarks or common law marks of International Business Machines Corporation in the United States and/or other countries.) The point-in-time copy function creates a "snapshot" of the contents of a source volume as of a particular point-in-time in a target volume which may be referred to as the point-in-time copy volume. One version of a point-in-time copy function transfers the contents of the source volume to the point-in-time copy volume in a background copy operation. The point-in-time copy function may also be referred to as a point-in-time snap copy function. A point-in-time copy may be described as a copy of the data consistent as of a particular point-in-time, and would not include updates to the data that occur after the point-in-time.

A point-in-time copy involves establishing a logical point-in-time relationship between source and target volumes on the same or different devices. The point-in-time copy guarantees that until a track in a point-in-time relationship has been hardened to its location on the target disk, the track resides on the source disk. A relationship table is used to maintain information on all existing point-in-time relationships in the subsystem. During the establish phase of a point-in-time relationship, one entry is recorded in the source relationship table for the source and in the target relationship table for the target that participate in the point-in-time being established. Each added entry maintains all the required information concerning the point-in-time relationship. Both entries for the relationship are removed from the relationship tables when all point-in-time tracks from the source extent have been physically copied to the target extents or when a withdraw command is received. In certain cases, even though all tracks have been copied from the source extent to the target extent, the relationship persists.

The target relationship table further includes a bitmap that identifies which tracks involved in the point-in-time relationship have not yet been copied over and are thus protected tracks. Each track in the target device is represented by one bit in the bitmap. The target bit is set (e.g., either logically or physically) when the corresponding track is established as a target track of a point-in-time relationship. The target bit is reset when the corresponding track has been copied from the source location and destaged to the target device due to writes on the source or the target device, or a background copy task.

Once the logical relationship is established, hosts may then have immediate access to data on the source and target volumes, and the data may be copied as part of a background operation. A read to a track that is a target in a point-in-time relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the point-in-time copy. Further, any destages to tracks on the source device that have not been copied over triggers a destage intercept, which causes the tracks on the source device to be copied to the target device.

Another version of a point-in-time copy function omits the background copy operation. Thus, the contents of the source volume are not transferred to the point-in-time copy volume in a background copy operation but are transferred in response to an update of the source volume. Accordingly, any read operations directed to a track of the point-in-time copy volume are usually redirected to obtain the contents of that track from the source volume. However, if the host directs an update to a track of the source volume, the contents of the track of the source volume are transferred to the point-in-time copy volume before the update is permitted to overwrite the contents of that track of the source volume.

In a synchronous data replication system, a point-in-time copy volume may be made of a primary volume at the primary system with respect to the contents of the primary volume as of a particular point-in-time, and a point-in-time copy volume may be made of a secondary volume at the secondary system with respect to the contents of the secondary volume as of the same point-in-time Because the primary and secondary volumes are synchronized, the respective point-in-time copy volumes will also be synchronized and therefore consistent with each other notwithstanding that the point-in-time copy volumes are made in different places, that is, the primary system and the secondary system.

In an asynchronous data replication system, a point-in-time copy volume may also be made of a primary volume at the primary system with respect to the contents of the primary volume as of a particular point-in-time Similarly, a point-in-time copy volume may be made of a secondary volume at the secondary system with respect to the contents of the secondary volume as of a particular point-in-time However, because the primary and secondary volumes are not synchronized, the respective point-in-time copy volumes will also not be synchronized and therefore will not be consistent with each other. Hence, to provide a backup copy of a point-in-time copy volume of a primary volume at the primary system, the point-in-time copy volume generated at the primary system is typically transferred over a network to the secondary system.

To maintain a degree of consistency of data across multiple volumes at a secondary system, a Peer-to-Peer Remote Copy (PPRC) function supports the concept of a PPRC consistency group. Volumes in a PPRC relationship that are configured into a PPRC consistency group are maintained to ensure that a group of updates made to volumes at the primary system are also eventually made on the volumes at the secondary system to maintain data consistency for those volumes of the group. Accordingly, consistency groups may be formed between volumes of the primary system and the secondary system which are consistent with respect to a particular set of updates or a particular point in time, notwithstanding the overall asynchronous relationship between the primary system and the secondary system.

In some environments, there is a point-in-time copy from a primary volume of a storage controller to a backup volume of the storage controller and to a recovery volume of the storage controller. Thus, the backup volume is the target for two point-in-time copies.

The backup volume may be referred to as a “safeguarded copy” backup volume, having safeguarded volumes, because the backup volume is not host accessible (e.g., not host addressable). Also, this backup volume contains “undo logs” that allow a user to view/update a particular consistency group (or time version) of the safeguarded volume. The consistency group is accessible by creating a relationship between the backup volume and the recovery volume, which is host accessible. The recovery volume is used to view/update the chosen consistency group of the backup volume. The backup volume may contain many terabytes of data and hundreds of different consistency groups. For any one data track, there may be hundreds of different consistency groups (e.g., if a track was updated during every consistency group).

This safeguarded copy function provides a set of more frequently taken and incremental backup copies in the backup volume to protect a safeguarded production volume (i.e., a primary volume). That is, safeguarded copies can be used to take may frequent copies (i.e., point-in-time copies) of a production environment (e.g., hourly copies maintained for a number of days) while the FlashCopy® function continues to be used to take a small number of less frequent copies (e.g., weekly copies maintained for a number of weeks). Safeguarded copies may then be expired at a predefined time period as set forth in a backup policy, which removes all backup copies and schedules for a safeguarded source.

It should be noted that, as used herein, the terms “safeguarded copy” and “immutable point-in-time copy” are intended to be interchangeable (i.e., a safeguarded copy is an immutable point-in-time copy).

While a safeguarded copy can be used to create frequent, non-disruptive, incremental backup copies of an enterprise, which may be used to recover individual files without having to capture any file-level metadata at the time of backup, a particular issue with this mechanism is that certain other operations (e.g., archival and expiration functions) may require the existence of individual file backup copies in order to execute.

For example, prior to executing operations which archive or expire a file stored on primary storage, a storage policy may define that a valid backup copy must exist for the file. This ensures the ability to recover the file in the event the archive copy is lost or the file is needed after the time of the file expiration (and removed/deleted) from the primary storage. When the safeguarded copy function is in use, one or more safeguarded copies capturing a current backup copy of the file may be used as this backup protection. However, since after the archival or expiration of the file occurs and the file will no longer reside on the primary storage which is being backed up by the safeguarded copy function, the ability to recover the file thus ends when the last copy of the safeguarded copy (or copies) that captured that file expires.

Accordingly, in certain embodiments, the present invention provides mechanisms to create only necessary file-level backup copies of a file(s) in a safeguarded copy environment to minimize the creation of individual file backup copies while ensuring policy-based automatic file-level archive and expiration functions are still performed. In certain embodiments, at a policy-based define time (or time window) prior to a file being eligible to be archived or expired (and removed/deleted) from a primary storage, an explicit, individual file backup (i.e., an explicit backup copy of only the file as taken from the primary storage) is created if a storage policy defines that a backup copy of the file is required to be maintained in storage for longer than an oldest (or last to be expired) safeguarded copy having captured that file is scheduled to be maintained in a recovery storage.

For example, consider a scenario where a first storage policy defines that each copy of a number of safeguarded copies, having captured a volume on primary storage containing a particular data set, are to be maintained (i.e., kept in storage prior to expiration and deletion thereof) for 8 weeks (e.g., 1 week on disk storage and 7 weeks on tape storage). Consider a second storage policy covering the data set which is due for expiration and removal from the primary storage defines that a backup copy of the data set must be maintained in backup storage for 4 weeks subsequent to the expiration of the data set. In this instance, no action is performed (i.e., a file-level backup of the data set is not initiated) because one or more of the existing safeguarded copies having captured the data thus satisfies the second storage policy covering the data set. That is, at least one of the safeguarded copies capturing the volume which contains the data set will be maintained in a recovery storage for at least 4 weeks longer than the second storage policy defines the backup of the data set must be maintained.

Conversely, consider that instead the second storage policy covering the data set defines that a backup copy of the data set should exceed 8 weeks (e.g., such as 'never expire'). In this instance, because the last safeguarded copy to capture the volume containing the data set will expire (and be removed/deleted) from storage after 8 weeks from being taken (according to the first storage policy), a valid backup of the data set too would be expired and removed/deleted from (any) storage with the expiration of the last safeguarded copy to capture the data. Accordingly, an explicit file backup of the data set (and only the data set) is taken from the primary storage and stored in the backup storage where the file backup is marked to never expire. This allows any operations, such as expire or archival functions, of the data set in primary storage to proceed in accordance with (a) storage policy defining such.

Referring now to the drawings, FIG. 1 illustrates, in a block diagram, a computing environment with a storage controller 120 coupled to a production storage 130, a backup storage 140, and a recovery storage 150 in accordance with certain embodiments. In various embodiments, the storage controller 120 may be a primary storage controller, a secondary storage controller, a tertiary storage controller, etc. In certain embodiments, the backup storage 140 is a safeguarded backup storage, having safeguarded volumes, that the backup storage 140 is not host accessible. The backup storage 140 includes backup volumes 142, which store data in consistency groups 144, and undo logs 146 (which store data and allow a user to view/update a particular consistency group (i.e., time version) of the safeguarded volume). In certain embodiments, the recovery storage 150 is host accessible.

A plurality of hosts 100*a*, 100*b*, . . . 100*n* are coupled, via a network 110, to the storage controller 120 of a system 115. The plurality of hosts 100*a*, 100*b*, . . . 100*n* may write updates to the storage controller 120 for storage in the production storage 130. Also, with embodiments, the plurality of hosts 100*a*, 100*b*, . . . 100*n* may submit Input/Output (I/O) requests to the storage controller (or "storage control unit") 120 over the network 110 to access data in production volumes 132 of the production storage 130 and recovery volumes 152 of the recovery storage 150.

The production storage 130, the backup storage 140, and the recovery storage 150 may be storage drives. The production volumes 132, the backup volumes 142, and the recovery volumes 152 may be, for example, Logical Unit Numbers, Logical Devices, Logical Subsystems, etc. In certain embodiments, recovery volumes 152 may include a pool of safeguarded copy volumes, which are stored separately from all other volumes in recovery volumes 152.

With certain embodiments, the production storage 130, the backup storage 140, and the recovery storage 150 may be located at different sites, which may be geographically or functionally remote from each other. Thus, in such embodiments, the geographically separate sites may be separated by a short or long geographical distance. Alternatively, the sites may be relatively close, such as in different buildings in the same general geographical location, in different rooms of the same building, in different machines in the same room, or in different portions or partitions of the same machine, of the network 110.

Figure 2:
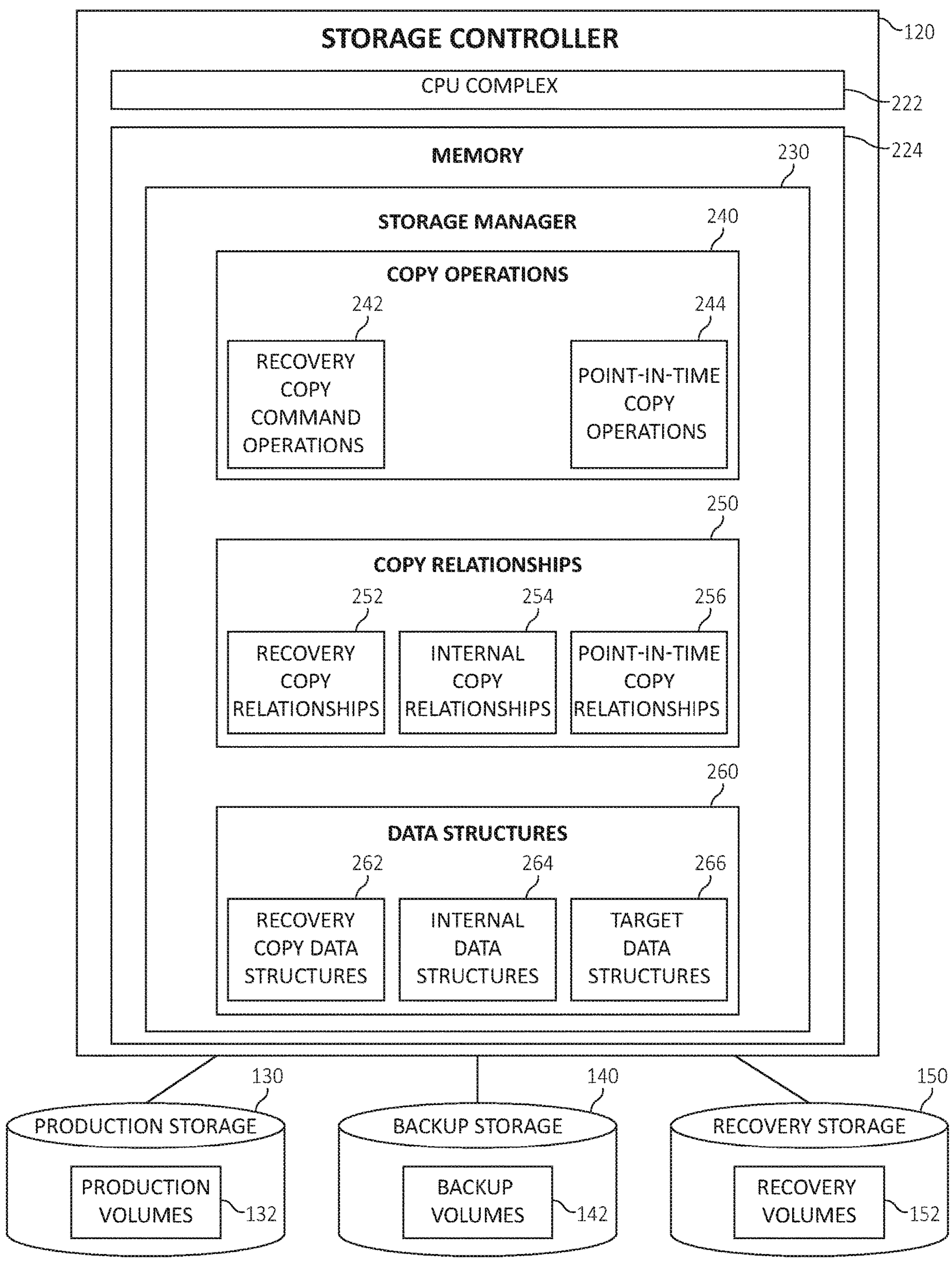
FIG. 2 illustrates, in a block diagram, further details of a storage controller in accordance with certain embodiments.

FIG. 2 illustrates, in a block diagram, further details of the storage controller 120 in accordance with certain embodiments. The storage controller 120 includes a Central Processing Unit (CPU) complex 222, including one or more processors or central processing units, each having a single or multiple processor cores. In certain embodiments, a processor core contains the components of a CPU involved in executing instructions, such as an arithmetic logic unit (ALU), floating point unit (FPU), and/or various levels of cache (such as LI and L2 cache), for example. It is appreciated that a processor core may have other logic elements in addition to or instead of those mentioned herein.

Also, the storage controller 120 includes a memory 224 that includes a storage manager 230 for managing storage operations, including data replication operations between storages 130, 140, 150. The storage manager 230 includes copy operations 240, copy relationships 250, and data structures 260 (e.g., bitmaps).

The copy operations 240 include recovery copy command operations 242 and point-in-time copy operations 244. The copy relationships 250 include recovery copy relationships 252 and internal copy relationships 254 for recovery copy command operations 242 and point-in-time copy relationships 256 for point-in-time copy operations 244.

With embodiments, at any time, there may be one or more of each of the copy operations 240 and the copy relationships 250.

In a particular copy relationship from a first volume to a second volume, the first volume is referred to as the source volume, while the second volume is referred to as the target volume.

The data structures 260 include recovery copy data structures 262, internal data structures 264, and target data structures 266.

In certain embodiments, a recovery copy data structure 262 is created for a recovery copy command and is stored on a target volume (instead of on the source volume). In certain embodiments, the recovery copy command copies data from a production volume (a source) to a production volume (a target). The recovery copy data structure 262 has an indicator (e.g., a bit) for each storage location (e.g., track). An indicator set to a first value (e.g., to one) indicates that data needs to be copied to that storage location. An indicator set to a second value (e.g., set to zero or "reset" to zero) indicates that the current data for the storage location is valid.

An internal data structure 264 is also created for the recovery copy command and is stored on the backup volume. The internal data structure 264 is used to indicate where data is to be retrieved for the recovery volume.

A target data structure 266 is created for a point-in-time copy operation and is stored on a target volume (instead of on the source volume). In certain embodiments, the point-in-time copy is from a production volume (a source) to a recovery volume (a target). An indicator set to a first value (e.g., to one) indicates that data needs to be copied to that storage location in the recovery volume from the production volume (the source) (and the current data for the storage location is at the production volume). An indicator set to a second value (e.g., set to zero or "reset" to zero) indicates that the current data for the storage location on the recovery volume is valid (e.g., data has been copied to the recovery volume from the production volume or has been written directly to the recovery volume).

The copy relationships 250 between a source and a target associate source storage locations in source volumes and corresponding target storage locations in target volumes, such that updates to source storage locations are copied to the corresponding target storage locations.

With embodiments, the storage manager 230 is depicted as software stored in the memory 224 and executed by the CPU complex 222. However, it is appreciated that the logic functions of the storage manager 230 may be implemented as hardware, software, firmware or combinations of one or more thereof, depending upon the particular application.

Figure 3:
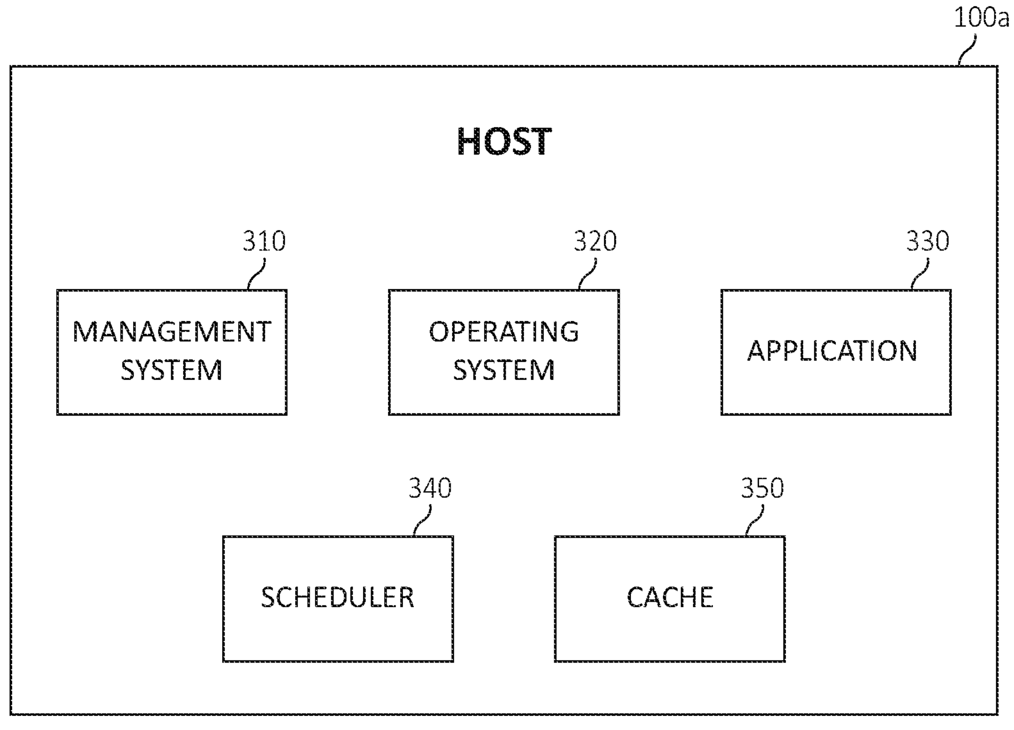
FIG. 3 illustrates, in a block diagram, further details of a host in accordance with certain embodiments.

FIG. 3 illustrates, in a block diagram, further details of the host 100*a* in accordance with certain embodiments. Although only host 100*a* is depicted for illustrative clarity, each of the hosts 100*b*, . . . 100*n* may include the components of host 100*a*. Host 100*a* includes a management system 310, an operating system 320, an application 330, a scheduler 340, and cache 350. The management system 310 allows a user to issue a copy command. The scheduler 340 periodically forms consistency groups on the backup volumes. The consistency groups may be referred to as time versions or recovery points starting at a point in time (a timestamp) and going to a "blackline" (a new timestamp). The blackline is set during the recovery copy command and is used to determine when to stop searching for data on the backup volume in a particular time version (i.e., consistency group). In certain embodiments, the blackline is set to a current consistency group insertion point. The application 330 reads data from and writes updates via a storage controller 120 to the production storage 130 or the recovery storage 150.

In certain embodiments, the management system 310 monitors failures in the availability of the storage controller 120 and its associated storage 130, 140, 150. In certain embodiments, the management system 310 and the application may be on different hosts. In certain embodiments, the management system 310 may be operated in a device apart from the hosts. In certain embodiments, a host that includes the management system 310 may omit the application 330.

As used herein, the term "storage location" may refer to a track of a disk storage unit, but may also reference to other units of data (or data units) configured in the storage 130, 140, 150 such as a bit, byte, word, segment, page, block (such as a Logical Block Address (LBA)), etc., which may be a part of a larger grouping of data units, such as those stored collectively as a volume, logical device, etc. of data.

In certain embodiments, the storages 130, 140, 150 are storage devices that may be comprised of one or more sequential access storage devices, such as hard disk drives and magnetic tape or may include non-sequential access storage devices such as solid state drives (SSD), for example. Each storage device may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

Furthermore, as used herein, the term "unit of storage" or "storage unit" refers to one or more units of data storage capable of storing one or more data units such as one or more volumes, cylinders, tracks, segments, extents, or any portion thereof, or other unit or units of data suitable for transfer. Thus, a source storage unit and the associated target storage unit may each be a storage volume. However, it is appreciated that a source storage unit and a target storage unit may each be of a size other than a volume, for example.

The system components 100*a*, 100*b*, . . . 100*n*, 120, 130, 140, 150 are connected to the network 110 which enables communication among these components. Thus, the network 110 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 100*a*, 100*b*, 100*n* may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 4:
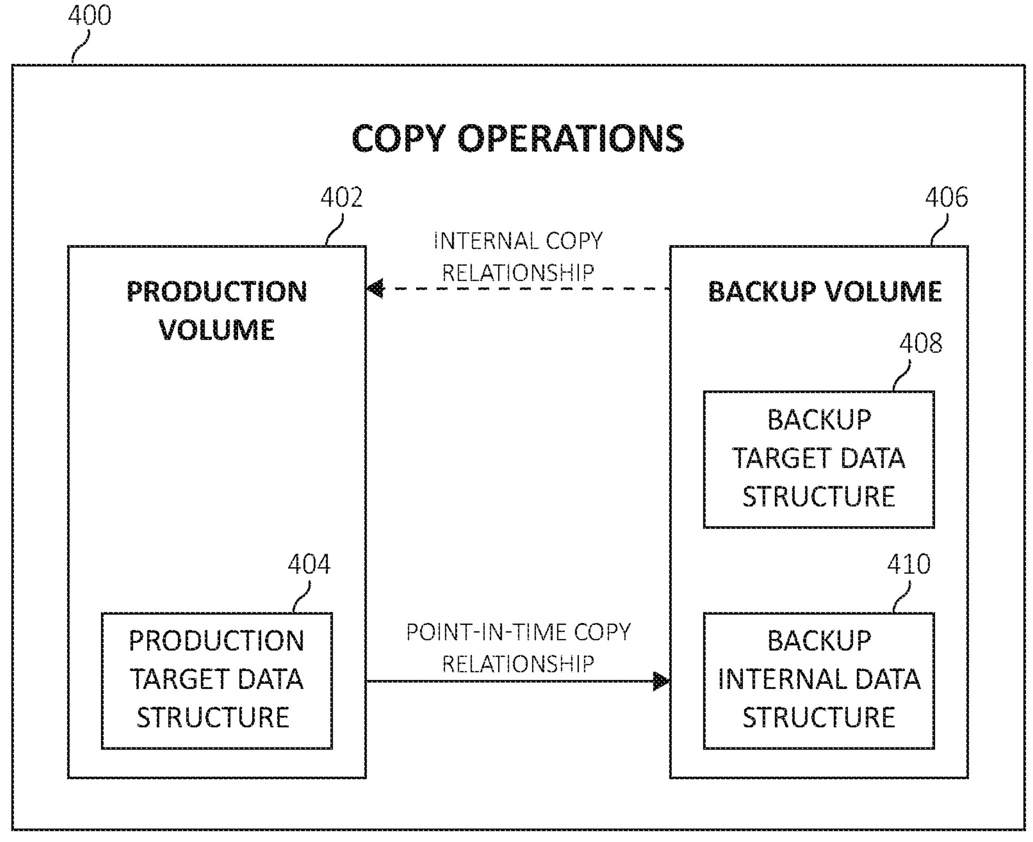
FIG. 4 illustrates copy operations in accordance with certain embodiments.

FIG. 4 illustrates copy operations 400 in accordance with certain embodiments. For a point-in-time copy operation from the production volume 402 (source) to the backup volume 406 (target), there is a point-in-time copy relationship between the production volume 402 and the backup volume 406 and there is a backup target data structure 408 that indicates whether storage locations on the backup volume 406 have current data copied over from the production volume 402. The point-in-time copy operation from the production volume 402 (source) to the backup volume 406 (target) may be referred to as a safeguarded relation. In certain embodiments, the backup target data structure 408 resides on the backup volume 406.

Also, for a recovery copy operation from the production volume 402 (source) to the production volume 402 (target), there is a recovery copy relationship between the production volume 402 and itself and there is a production target data structure 404 that indicates whether storage locations on the production volume 402 have current data. In certain embodiments, the production target data structure 404 resides on the production volume 402. In certain embodiments, for the recovery copy relationship, there is also an internal copy relationship from the backup volume 406 (source) to the production volume 402 (backup) and there is a backup internal data structure 410 that is used to indicate where data is to be retrieved for the production volume 402.

Figure 5:
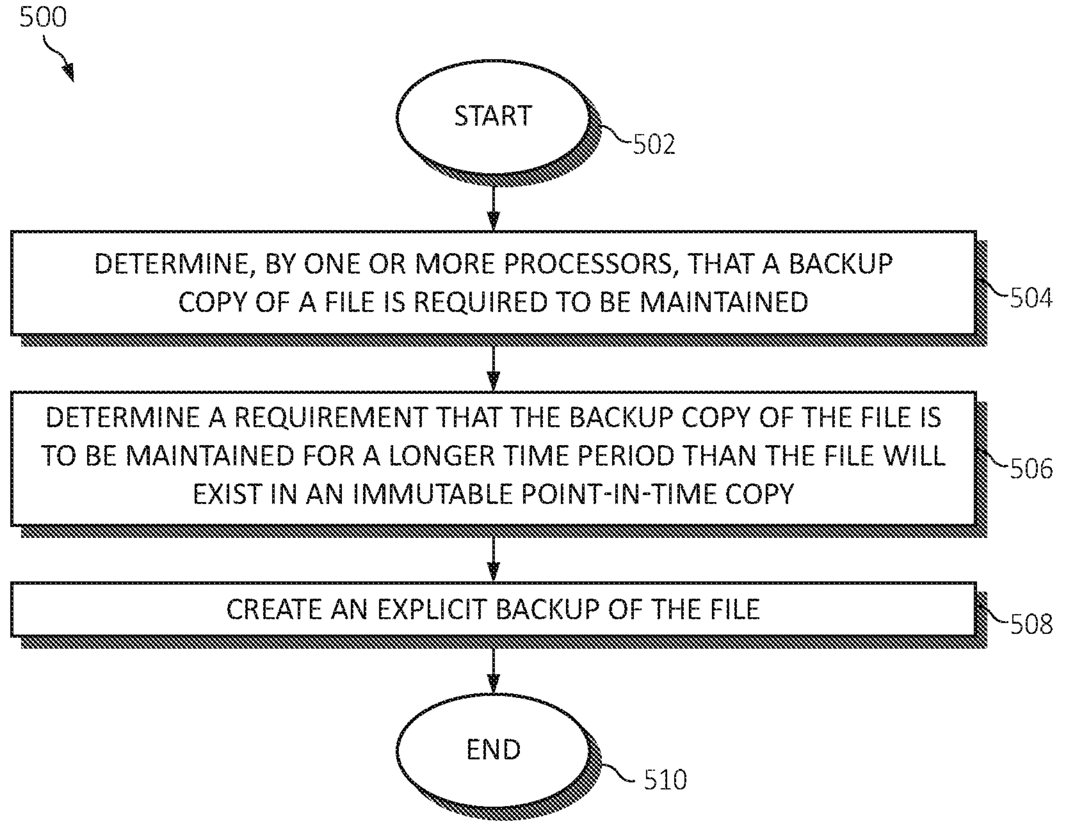
FIGS. 5 and 6 illustrate, in a flowchart, operations for creating an explicit backup copy of a file in accordance with certain embodiments.

FIG. 5 illustrates, in a flowchart, a method 500 of a summary of operations for creating an explicit backup copy of a file (e.g., consistent with the copy operations 400 of FIG. 4) in accordance with certain embodiments. It should be noted that the operations of the method 500 may be performed by the storage controller 115 of the system 120 (i.e., as executed by the storage manager 230 by the CPU complex 222), in coordination with commands sent and/or received by the hosts 100*a*, 100*b*, . . . 100*n* commensurate with the description of FIGS. 1-4.

Starting in block 502, a determination is made that a requirement exists defining a backup copy of a file is to be maintained for a predefined time period, in block 504. Responsive to determining the requirement exists, a determination is made that one or more immutable point-in-time copies (safeguarded copies) currently stored on a storage device in system 120 include/contain a current backup copy of the file, in block 506. Responsive to determining that the one or more immutable point-in-time copies including/containing the file will expire (and be removed/deleted from the storage device in system 120) prior to an end of the predefined time period (i.e., the predefined time frame is longer than the one or more immutable point-in-time copies are scheduled to be maintained in storage prior to expiration and deletion), an individual backup of the file (i.e., only the file) is created and stored in the system 120, at block 508. The method 500 ends, in block 510.

Figure 6:
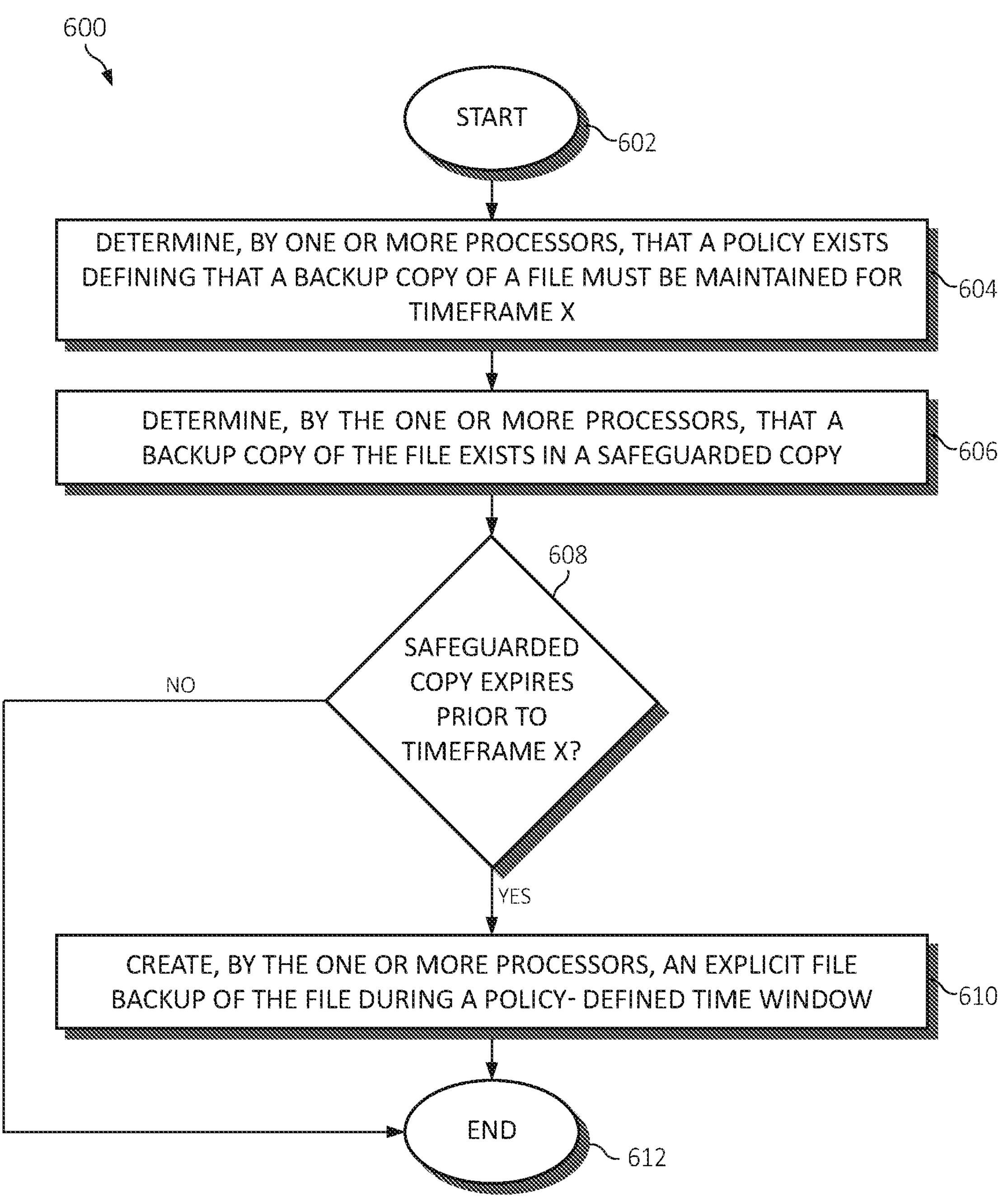

FIG. 6 illustrates, in a flowchart, a method 600 of detailed operations for creating an explicit backup copy of a file (e.g., consistent with the copy operations 400 of FIG. 4) in accordance with certain embodiments. It should be noted that the operations of the method 600 may be performed by the storage controller 115 of the system 120 (i.e., as executed by the storage manager 230 by the CPU complex 222), in coordination with commands sent and/or received by the hosts 100*a*, 100*b*, . . . 100*n* commensurate with the description of FIGS. 1-4.

Starting in block 602, a determination is made by the storage controller 120 that a storage policy in storage manager 240 exists defining that a backup copy of a file contained in a volume of production volumes 132 of production storage 130 must be maintained (stored) for timeframe x (e.g., 10 weeks commencing from a time which the file is scheduled by the storage policy to be expired and deleted from the production storage 130), at block 604. Responsive to the determination in block 604, a determination is made by the storage controller 120 that a backup copy of the file currently exists in one or more safeguarded copies (i.e., immutable point-in-time copies) stored in a recovery volume 152 of recovery storage 150, in block 606. At block 608, a determination is made as to whether each (all) of the one or more safeguarded copies stored in recovery volume 152 of recovery storage 150 will expire and be removed/deleted from storage 150 (based on a storage policy defining the safeguarded copies for the particular volume they captured) at a time prior to an end of timeframe x. If, at block 608, the storage controller 120 determines that at least one of the one or more safeguarded copies stored in recovery volume 152 of recovery storage 150 will, according to the storage policy governing them, not expire prior to timeframe x, no action is performed and the method 600 ends, at block 612.

Returning to block 608, if a determination is made by the storage controller 120 that each (all) of the one or more safeguarded copies containing the file and currently stored in recovery volume 152 of recovery storage 150 will expire (and be removed/deleted) from the recovery storage 150 prior to an end of timeframe x, the storage controller 120 creates an explicit individual backup copy of the file (and only the file) during a backup policy-based time window, and stores the explicit individual backup copy of the file in backup storage 140 and/or recovery storage 150, at block 610. In certain embodiments, the policy-based define time window is defined as a time (or timeframe) prior to a time the file stored in the volume of the production volumes 132 of the production storage 130 is scheduled (by storage policy) to expire and/or be archived (i.e., removed/deleted from production storage 130). This allows storage controller 120 to proceed with expiration and/or archival functions, for example, of file (and/or a volume containing the file) in production storage 130 on a policy-defined schedule, which may execute subsequent to block 10. The method 600 ends, at block 612.

It should be noted that various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
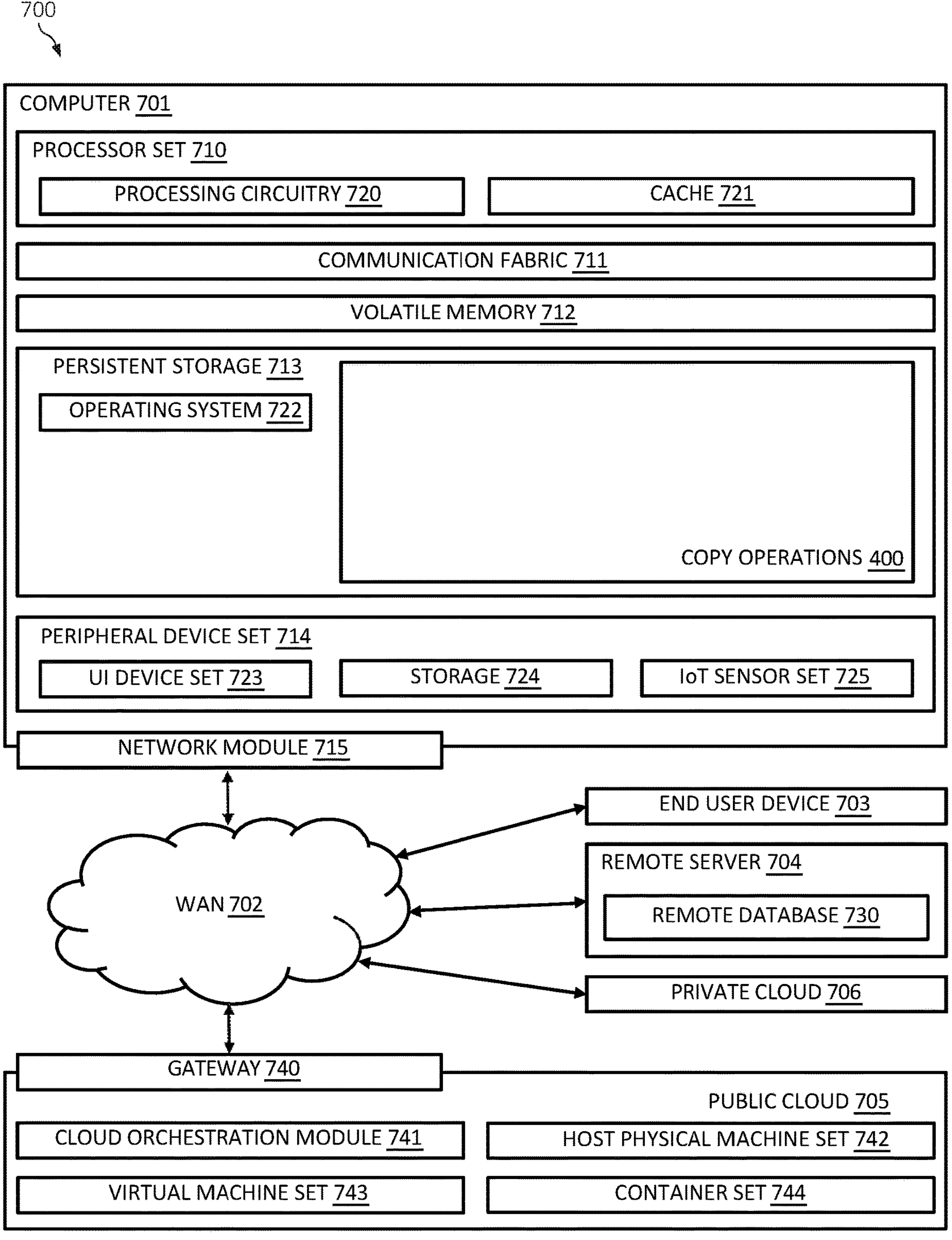
FIG. 7 illustrates a computing architecture in which the components of FIG. 1 may be implemented in accordance with certain embodiments.

FIG. 7 illustrates a computing environment 700 in which the components of FIG. 1 may be implemented in accordance with certain embodiments. In certain embodiments, the hosts 100*a*, 100*b*, . . . 100*n* and the storage controller 120 may implement computing environment 700.

Computing environment 700 contains an example of an environment for the execution of at least some of the computer code involved in performing the inventive methods, such as copy operations 400. In addition to block 400, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 400, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 400 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 400 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The invention claimed is:

1. A computer-implemented method for minimizing creations of individual file backups in a safeguarded copy environment, the computer-implemented method comprising:

determining, by one or more processors, a requirement exists that a backup copy of a file is to be maintained for a predefined time period;

responsive to the determining the requirement exists, determining, by the one or more processors, that one or more immutable point-in-time copies currently stored on a storage device includes a current backup copy of the file; and responsive to determining that the one or more immutable point-in-time copies will expire at a time prior to an end of the predefined time period, creating, by the one or more processors, an individual backup of the file.

2. The computer-implemented method of claim 1, wherein the individual backup of the file is an explicit backup of only the file.

3. The computer-implemented method of claim 1, wherein the determining of the requirement is performed according to a policy-based file retention schedule.

4. The computer-implemented method of claim 1, wherein the creating of the individual backup of the file is performed to enable operation of backup functions of the file stored in a primary storage device.

5. The computer-implemented method of claim 1, wherein the one or more immutable point-in-time copies comprise a plurality of immutable point in time copies, and wherein the determining that the requirement exists further includes determining, by the one or more processors, that each of the plurality of immutable point-in-time copies respectively containing the current backup copy of the file expires prior to the end of the predefined time period.

6. The computer-implemented method of claim 1, wherein the creating of the individual backup of the file is performed during a policy-based time window.

7. The computer-implemented method of claim 6, wherein the policy-based time window is defined as a timeframe prior to expiring or archiving the file to remove the file from a primary storage device.

8. A system for minimizing creations of individual file backups in a safeguarded copy environment, comprising:

one or more processors; and one or more memory storing instructions executed by the one or more processors, the instructions, when executed, causing the one or more processors to:

determine, by the one or more processors, a requirement exists that a backup copy of a file is to be maintained for a predefined time period;

responsive to the determining the requirement exists, determine, by the one or more processors, that one or more immutable point-in-time copies currently stored on a storage device includes a current backup copy of the file; and responsive to determining that the one or more immutable point-in-time copies will expire at a time prior to an end of the predefined time period, create, by the one or more processors, an individual backup of the file.

9. The system of claim 8, wherein the individual backup of the file is an explicit backup of only the file.

10. The system of claim 8, wherein the determining of the requirement is performed according to a policy-based file retention schedule.

11. The system of claim 8, wherein the creating of the individual backup of the file is performed to enable operation of backup functions of the file stored in a primary storage device.

12. The system of claim 8, wherein the one or more immutable point-in-time copies comprise a plurality of immutable point in time copies, and wherein the determining that the requirement exists further includes determining, by the one or more processors, that each of the plurality of immutable point-in-time copies respectively containing the current backup copy of the file expires prior to the end of the predefined time period.

13. The system of claim 8, wherein the creating of the individual backup of the file is performed during a policy-based time window.

14. The system of claim 13, wherein the policy-based time window is defined as a timeframe prior to expiring or archiving the file to remove the file from a primary storage device.

15. A computer program product for minimizing creations of individual file backups in a safeguarded copy environment, the computer program product comprising:

one or more computer readable storage media, and program instructions collectively stored on the one or more computer readable storage media, the program instructions comprising:

program instructions to determine, by one or more processors, a requirement exists that a backup copy of a file is to be maintained for a predefined time period;

program instructions to, responsive to the determining the requirement exists, determine, by the one or more processors, that one or more immutable point-in-time copies currently stored on a storage device includes a current backup copy of the file; and program instructions to, responsive to determining that the one or more immutable point-in-time copies will expire at a time prior to an end of the predefined time period, create, by the one or more processors, an individual backup of the file.

16. The computer program product of claim 15, wherein:

the individual backup of the file is an explicit backup of only the file; and the determining of the requirement is performed according to a policy-based file retention schedule.

17. The computer program product of claim 15, wherein the creating of the individual backup of the file is performed to enable operation of backup functions of the file stored in a primary storage device.

18. The computer program product of claim 15, wherein the one or more immutable point-in-time copies comprise a plurality of immutable point in time copies, and wherein the determining that the requirement exists further includes determining, by the one or more processors, that each of the plurality of immutable point-in-time copies respectively containing the current backup copy of the file expires prior to the end of the predefined time period.

19. The computer program product of claim 15, wherein the creating of the individual backup of the file is performed during a policy-based time window.

20. The computer program product of claim 19, wherein the policy-based time window is defined as a timeframe prior to expiring or archiving the file to remove the file from a primary storage device.

* * * * *